(12) United States Patent
Ichikawa et al.

(10) Patent No.: US 6,591,326 B1
(45) Date of Patent: Jul. 8, 2003

(54) METHOD AND INFORMATION PROCESSING APPARATUS CONTROLLING INFORMATION TRANSFER AMONG A PLURALITY OF PROCESSORS

(75) Inventors: Teruaki Ichikawa, Kawasaki (JP); Hiroshi Shibata, Kawasaki (JP); Kazuyoshi Takayama, Kawasaki (JP); Akira Takakusagi, Kawasaki (JP); Hitoshi Kosokabe, Kawasaki (JP); Masayuki Shimizu, Kawasaki (JP); Hiroyuki Egawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/533,068

(22) Filed: Mar. 22, 2000

(30) Foreign Application Priority Data

Sep. 28, 1999 (JP) .............................. 11-274660

(51) Int. Cl.[7] .............................................. G06F 13/00
(52) U.S. Cl. ...................................... 710/316; 710/200
(58) Field of Search .................................. 710/316, 200

(56) References Cited

U.S. PATENT DOCUMENTS

| | | | | |
|---|---|---|---|---|
| 3,699,525 A | * | 10/1972 | Klavins | ................ 178/3 |
| 4,633,387 A | * | 12/1986 | Hartung et al. | ............. 709/105 |
| 5,655,076 A | * | 8/1997 | Kimura et al. | ................. 714/25 |
| 5,761,465 A | * | 6/1998 | Nimishakvi et al. | ........ 370/466 |
| 5,896,516 A | | 4/1999 | Powell, Jr. et al. | |
| 6,128,689 A | * | 10/2000 | Hassbjer et al. | ............ 710/200 |
| 6,327,175 B1 | * | 12/2001 | Manapat et al. | ............ 365/154 |
| 6,353,906 B1 | * | 3/2002 | Smith et al. | ................ 714/731 |

FOREIGN PATENT DOCUMENTS

| | | |
|---|---|---|
| JP | 61-231955 | 9/1986 |
| JP | 4-352021 | 12/1992 |
| JP | 8-278939 | 10/1996 |
| JP | 9-81508 | 3/1997 |

* cited by examiner

*Primary Examiner*—Rupal Dharia
(74) *Attorney, Agent, or Firm*—Staas & Halsey LLP

(57) ABSTRACT

A transfer control method includes a selecting step which selects one of a first route for making an asynchronous transfer to a request destination via a control block and a second route for making a synchronous transfer to the request destination by not passing the control block, with respect to a request from a request source.

12 Claims, 18 Drawing Sheets

METHOD AND INFORMATION PROCESSING APPARATUS CONTROLLING INFORMATION TRANSFER AMONG A PLURALITY OF PROCESSORS

BACKGROUND OF THE INVENTION

1. Field of the Invention

The present invention generally relates to transfer control methods and information processing apparatuses, and more particularly to a transfer control method for controlling transfer of information such as data and commands with respect to a plurality of processors, and to an information processing apparatus which employs such a transfer control method.

In an information processing apparatus having a plurality of processors, the amount of data processed is extremely large. For this reason, there are demands to realize a transfer control method which can transfer data among the processors at a high speed.

2. Description of the Related Art

FIG. 1 is a system block diagram for explaining an example of a conventional transfer control method. An information processing apparatus shown in FIG. 1 generally includes a plurality of processors 1-1 through 1-n, a control block 2, and a reserve 3. The control block 2 is a kind of processor which has a buffering function and is provided for exclusive control. The reserve 3 is made up of a register which indicates a transfer status of data or command among the processors 1-1 through 1-n (transfer units). The transfer status indicates busy or free, and is used for the exclusive control of the transfer. For the sake of convenience, it is assumed that the processor 1-1 forms a request source, and the processors 1-2 through 1-n form request destinations.

When the request source processor 1-1 generates a request, the data and commands from the request source processor 1-1 are once supplied to and stored in the control block 2. Based on the stored data and commands, the control block 2 acquires the reserve 3 between the control block 2 and the request destination processor 1-2, for example, and transfers the data and commands to the request destination processor 1-2.

Accordingly, after supplying the data and commands to the control block 2, the request source processor 1-1 can carry out other processes.

However, according to the conventional transfer control method, the transfer of the data and commands from the request source processor 1-1 to the request destination processor 1-2 is made asynchronously, and there was a problem in that a synchronous transfer of the data and commands cannot be made.

In addition, in a case where the request source processor 1-1 successively generates requests, it is necessary to acquire the reserve 3 each time the request is generated, and there was another problem in that the transfer efficiency is poor.

SUMMARY OF THE INVENTION

Accordingly, it is a general object of the present invention to provide a novel and useful transfer control method and information processing apparatus, in which the problems described above are eliminated.

Another and more specific object of the present invention is to provide a transfer control method and information processing apparatus, which can make synchronous transfer and asynchronous transfer of data and commands, and also improve the transfer efficiency.

Still another object of the present invention is to provide a transfer control method comprising a selecting step which selects one of a first route for making an asynchronous transfer to a request destination via a control block and a second route for making a synchronous transfer to the request destination by not passing the control block, with respect to a request from a request source. According to the transfer control method of the present invention, it is possible to realize synchronous transfer and asynchronous transfer of data and commands, and also improve the transfer efficiency.

A further object of the present invention is to provide an information processing apparatus comprising a control block at least having a buffering function, and a selector selecting one of a first route for making an asynchronous transfer to a request destination via the control block and a second route for making a synchronous transfer to the request destination by not passing the control block, with respect to a request from a request source. According to the information processing apparatus of the present invention, it is possible to realize synchronous transfer and asynchronous transfer of data and commands, and also improve the transfer efficiency.

Other objects and further features of the present invention will be apparent from the following detailed description when read in conjunction with the accompanying drawings.

DESCRIPTION OF THE PREFERRED EMBODIMENTS

A description will be given of embodiments of the transfer control method and the information processing apparatus according to the present invention, by referring to FIG. 2 and the subsequent drawings.

Figure 1:
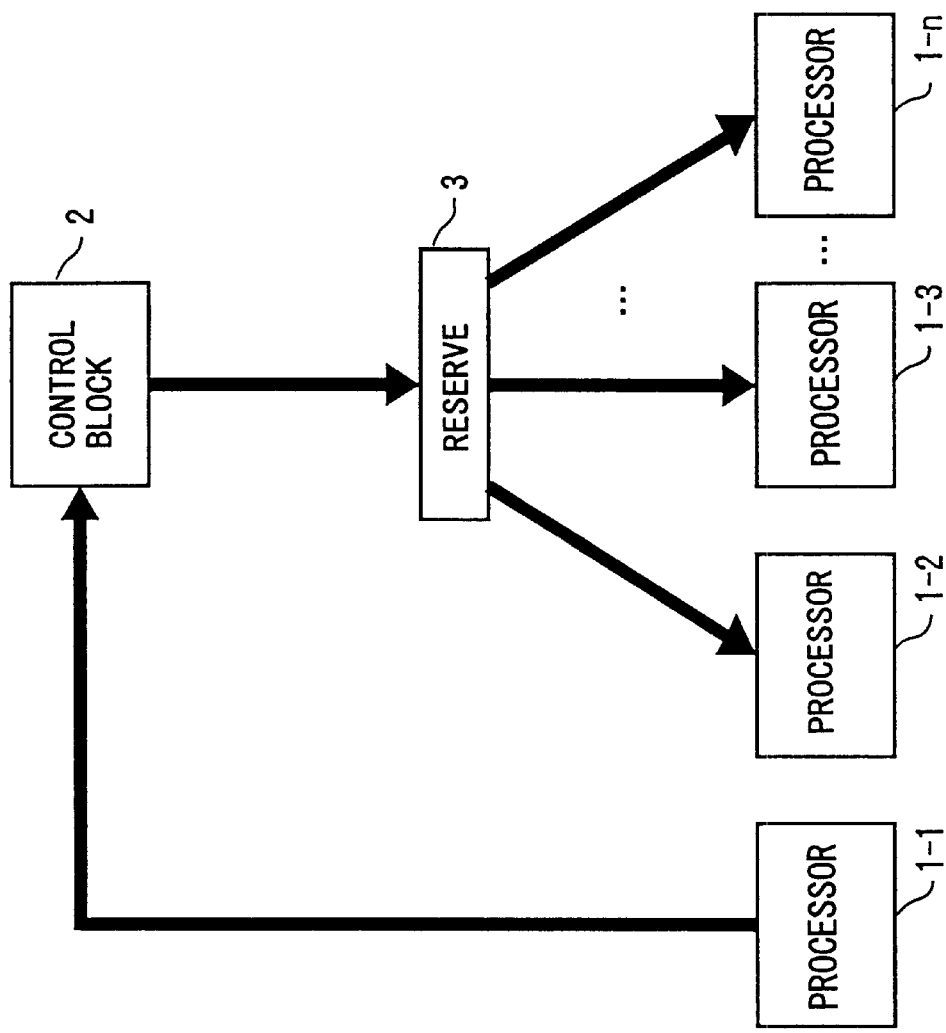
FIG. 1 is a system block diagram for explaining an example of a conventional transfer control method.
Figure 2:
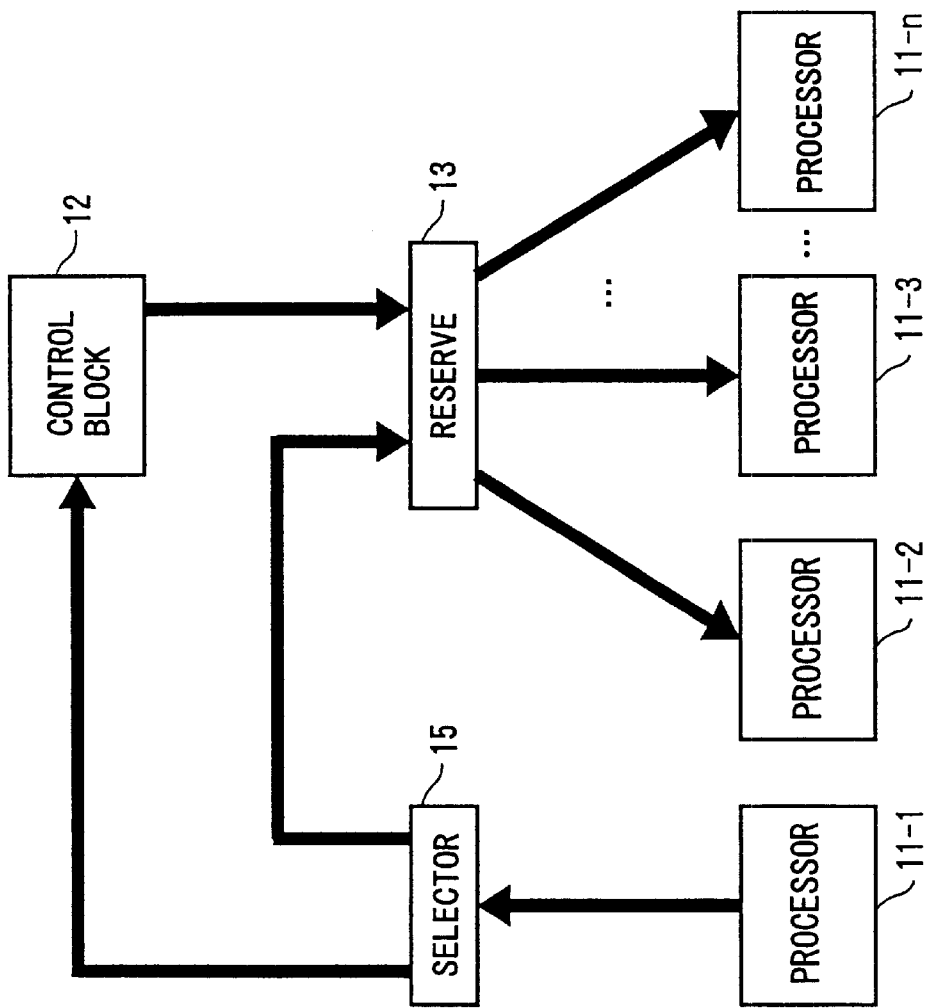
FIG. 2 is a system block diagram showing a first embodiment of an information processing apparatus according to the present invention.

FIG. 2 is a system block diagram showing a first embodiment of the information processing apparatus according to the present invention. This first embodiment of the information processing apparatus employs a first embodiment of the transfer control method according to the present invention.

An information processing apparatus shown in FIG. 2 generally includes a plurality of processors 11-1 through 11-n, a control block 12, a reserve 13, and a selector 15. The control block 12 is a kind of processor which has a buffering function and is provided for exclusive control. For the sake of convenience, it is assumed that the processor 11-1 forms a request source, and the processors 11-2 through 11-n form request destinations.

When the request source processor 11-1 generates a request, data and commands from the request source processor 11-1 are once supplied to the selector 15. Based on route information included in the data and commands supplied thereto, the selector 15 supplies the data and commands to the control block 12 or the reserve 13. The route information indicates whether a route for the data and commands from the request source processor 11-1 is a route for asynchronous transfer (hereinafter simply referred to as an asynchronous transfer route) which supplies the data and commands to the reserve 13 via the control block 12, or a route for synchronous transfer (hereinafter simply referred to as a synchronous transfer route) which supplies the data and commands directly to the reserve 13.

Accordingly, in a case where the route information indicates the asynchronous transfer route, the data and commands from the request source processor 11-1 are once supplied to and stored in the control block 12. Based on the stored data and commands, the control block 12 acquires the reserve 13 between the control block 12 and the request destination processor 11-2, for example, and transfers the data and commands to the request destination processor 11-2. After supplying the data and commands to the control block 12, the request source processor 11-1 can carry out other processes.

On the other hand, in a case where the route information indicates the synchronous transfer route, the data and commands from the request source processor 11-1 are supplied directly to the reserve 13. In other words, the reserve 13 between the selector 15 and the request destination processor 11-2, for example, is acquired, and the data and commands are transferred to the request destination processor 11-2.

Therefore, according to this embodiment, it is possible to selectively make the synchronous transfer and the asynchronous transfer.

The reserve 13 which is once acquired may be held, so that the transfer can be made successively without newly acquiring the reserve 13. In other words, after the synchronous transfer route is selected and the data and commands are supplied directly to the reserve 13, the reserve 13 may continue to be acquired, so that successive transfer from the request source processor 11-1 is possible without newly acquiring the reserve 13. In addition, after the request source sends the request to the request destination, the reserve may be held even in a case where it is desirable to receive a response or the like from the request destination with respect to the request, so that the transfer may be made from the request destination as if the request destination acquired the reserve.

Figure 3:
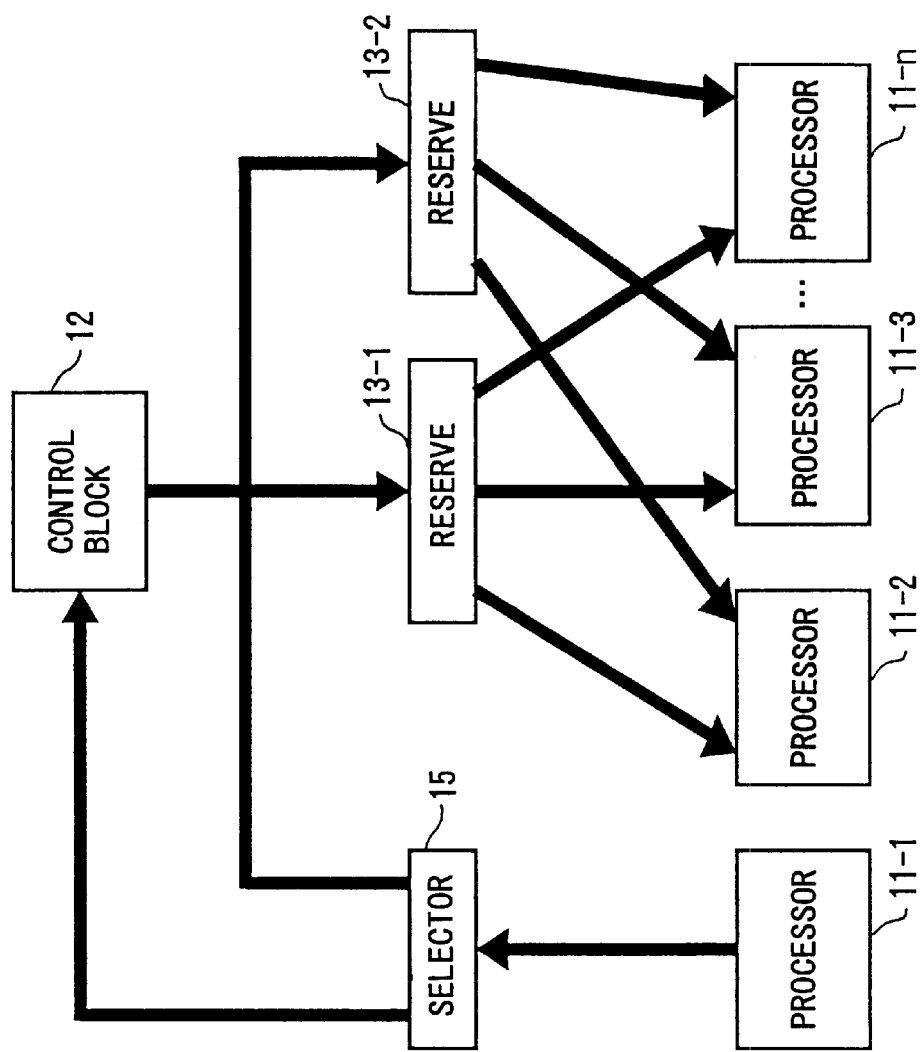
FIG. 3 is a system block diagram showing a second embodiment of the information processing apparatus according to the present invention.

FIG. 3 is a system block diagram showing a second embodiment of the information processing apparatus according to the present invention. This second embodiment of the information processing apparatus employs a second embodiment of the transfer control method according to the present invention. In FIG. 3, those parts which are the same as those corresponding parts in FIG. 2 are designated by the same reference numerals, and a description thereof will be omitted.

In this embodiment, one reserve is provided for each route, as shown in FIG. 3. More particularly, a reserve 13-1 is provided with respect to the asynchronous transfer route, and a reserve 13-2 is provided with respect to the synchronous transfer route.

In the following description, states of the reserves 13-1 and 13-2 are described by a state code (X, Y), where a busy state is indicated by "1" and a free state is indicated by "0". In the case where the asynchronous transfer route is selected, the acquisition of the reserve 13-1 is made possible regardless of the states of the reserves 13-1 and 13-2. On the other hand, in the case where the synchronous transfer route is selected, the acquisition of the reserve 13-2 is made possible only when the state code of the reserves 13-1 and 13-2 is (0, 0). Hence, even if the synchronous transfer route is already selected and the state code of the reserves 13-1 and 13-2 is (0, 1), when the request for asynchronous transfer is generated, it is possible to provisionally acquire the reserve 13-1 and to make the state code of the reserves 13-1 and 13-2 become (1, 1).

In addition, by including, in the data and commands which are transferred via the asynchronous transfer route, information which indicates whether or not to give priority to the transfer over the data and commands transferred via the synchronous transfer route, the control block 12 can select and send an instruction which instructs whether the state code (1, 1) from the reserves 13-1 and 13-2 is to be changed to state code (0, 1) or maintained and held as (1, 1). When giving priority to the request for the asynchronous transfer route, the control block 12 sends an instruction which instructs the state code (1, 1) from the reserves 13-1 and 13-2 to be maintained and held.

The request for the synchronous transfer route can acquire the reserve 13-2 only when the state code of the reserves 13-1 and 13-2 is (0, 0). Hence, after the request for the synchronous transfer route ends, it is possible to transfer the data and commands by giving priority to the request for the asynchronous transfer route which provisionally acquired the reserve 13-1.

On the other hand, when not giving priority to the request for the asynchronous transfer route, the control block 12 sends an instruction which instructs the state code of the reserves 13-1 and 13-2 to be changed to (0, 1). Thereafter, it is possible to accept a request for the asynchronous transfer route and a request for the synchronous transfer route.

By providing different reserves depending on the routes, it becomes possible to be aware of the state of the request in more detail, thereby facilitating analysis of causes of an error or the like when the error is generated.

Figure 4:
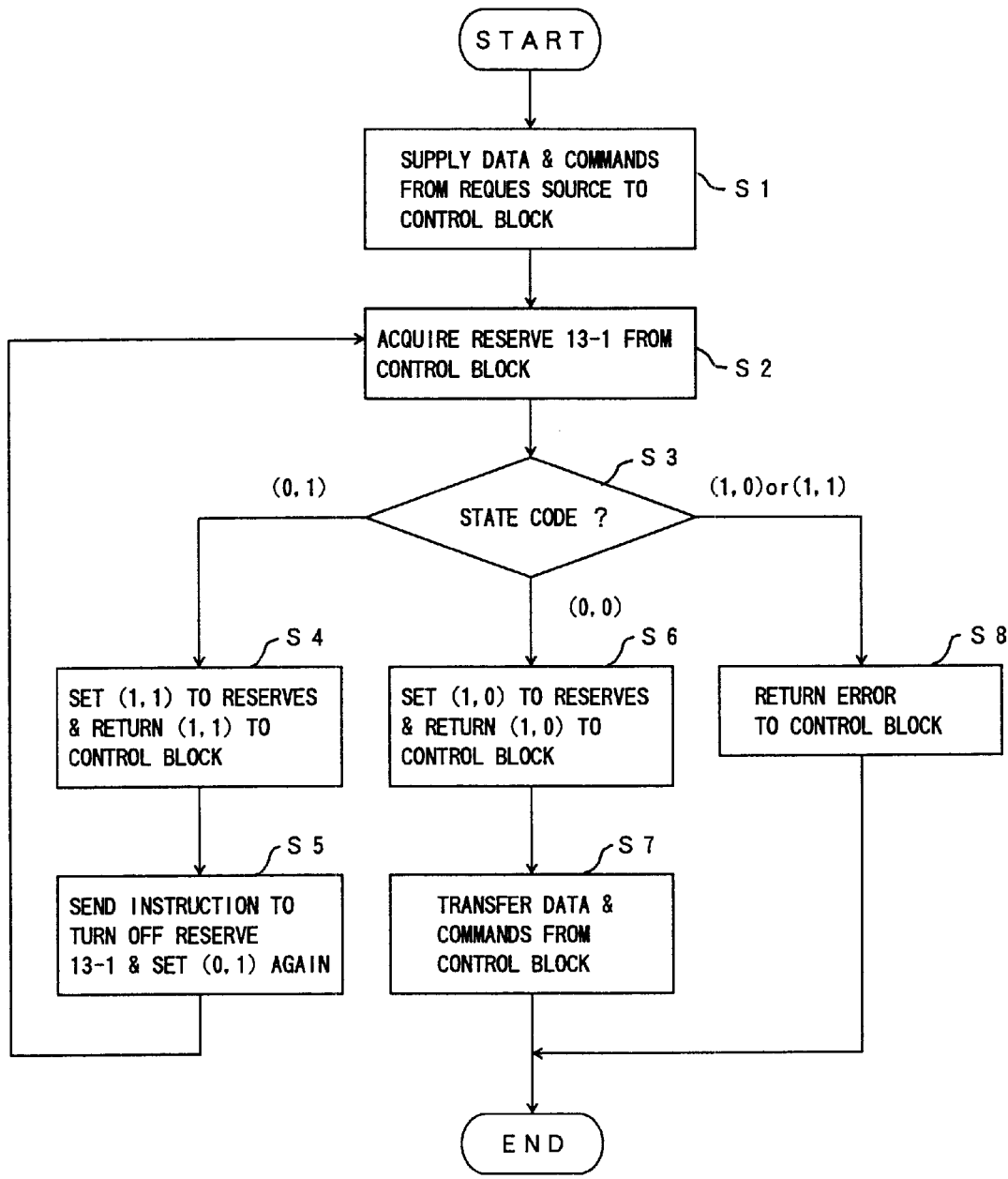
FIG. 4 is a flow chart for explaining the operation of the second embodiment when an asynchronous transfer route is selected.

FIG. 4 is a flow chart for explaining the operation of this second embodiment when the route for the asynchronous transfer is selected. In FIG. 4, a step S1 supplies the data and commands from the request source processor 11-1 to the control block 12 via the selector 15. A step S2 acquires the reserve 13-1 from the control block 12. A step S3 decides whether the state code of the reserves 13-1 and 13-2 is (0, 1) or, (0, 0) or, either one of (1, 0) and (1, 1).

If the step S3 determines that the state code of the reserves 13-1 and 13-2 is (0, 1), a step S4 sets state code (1, 1) to the reserves 13-1 and 13-2, and returns the state code (1, 1) to the control block 12. In addition, a step S5 sends from the control block 12 an instruction for turning OFF the reserve 13-1, and sets the state code (0, 1) again. After the step S5, the process returns to the step S2.

If the step S3 determines that the state code of the reserves 13-1 and 13-2 is (0, 0), a step S6 sets the state code (1, 0) to the reserves 13-1 and 13-2, and returns the state code (1, 0) to the control block 12. In addition, a step S7 transfers the data and commands from the control block 12 to the reserve 13-1, and the process ends.

On the other hand, if the step S3 determines that the state code of the reserves 13-1 and 13-2 is (1, 0) or (1, 1), a step S8 returns an erroneous state code to the control block 12, and the process ends.

Figure 5:
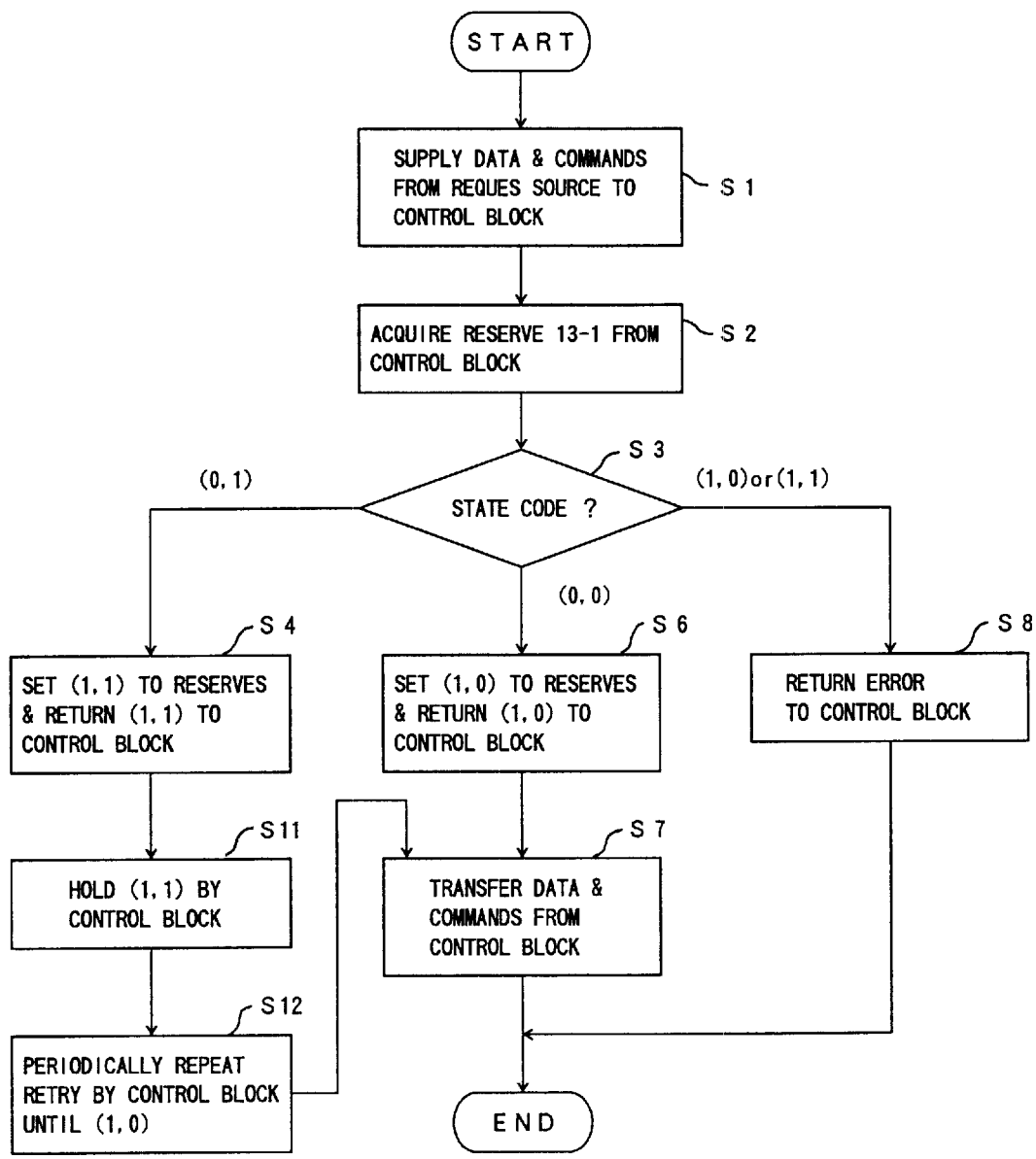
FIG. 5 is a flow chart for explaining the operation of the second embodiment when an asynchronous transfer route is given priority after a request using a synchronous transfer route ends.

FIG. 5 is a flow chart for explaining the operation of this second embodiment when the asynchronous transfer route is given priority after the request for the synchronous transfer route ends. In FIG. 5, those steps which are the same as those corresponding steps in FIG. 4 are designated by the reference numerals, and a description thereof will be omitted.

If the step S3 determines that the state code of the reserves 13-1 and 13-2 is (0, 1), the step S4 sets state code (1, 1) to the reserves 13-1 and 13-2, and returns the state code (1, 1) to the control block 12. In addition, a step S11 holds the state code (1, 1) by the control block 12 without turning OFF the reserve 13-1 by the control block 12. Further, a step S12 periodically repeats a retry by the control block 12 until the state code becomes (1, 1), and the process advances to the step S7. In this case, the step S7 transfers the data and commands from the control block 12 to the reserve 13-1, and the process ends.

Figure 6:
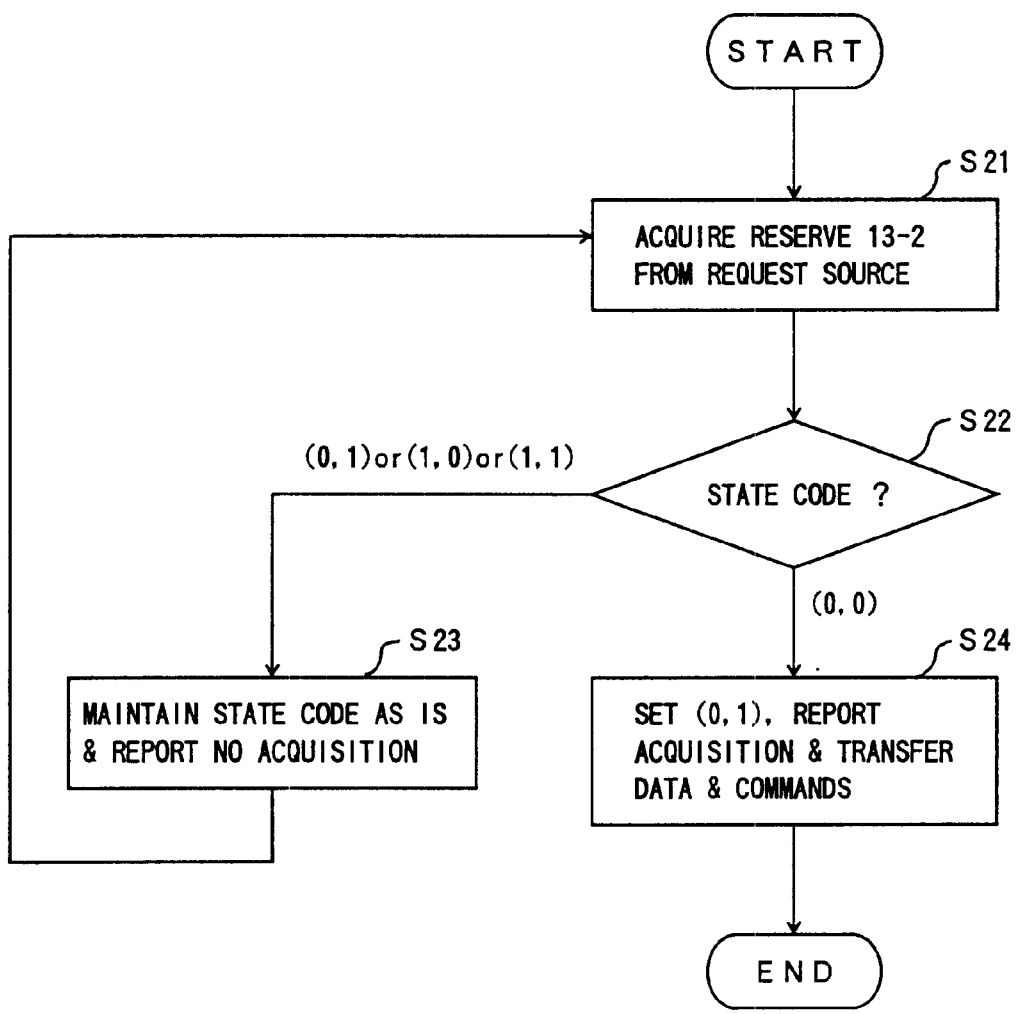
FIG. 6 is a flow chart for explaining the operation of the second embodiment when a synchronous transfer route is selected.

FIG. 6 is a flow chart for explaining the operation of this second embodiment when the synchronous transfer route is selected. In FIG. 6, a step S21 acquires the reserve 13-2 from the request source processor 11-1. A step S22 decides whether the state code of the reserves 13-1 and 13-2 is one of (0, 1), (1, 0) and (1, 1) or, (0, 0).

If the step S22 determines that the state code of the reserves 13-1 and 13-2 is one of (0, 1), (1, 0) and (1, 1), a step S23 maintains the state code of the reserves 13-1 and 13-2 as it is, and reports to the request source processor 11-1 that the reserve 13-2 could not be acquired. The process returns to the step S21 after the step S23. On the other hand, if the step S22 determines that the state code of the reserves 13-1 and 13-2 is (0, 0), a step S24 sets the state code (0, 1) to the reserves 13-1 and 13-2, reports to the request source processor 11-1 that the reserve 13-2 was acquired, and transfers the data and commands from the request source processor 11-1 to the reserve 13-2. The process ends after the step S24.

Figure 7:
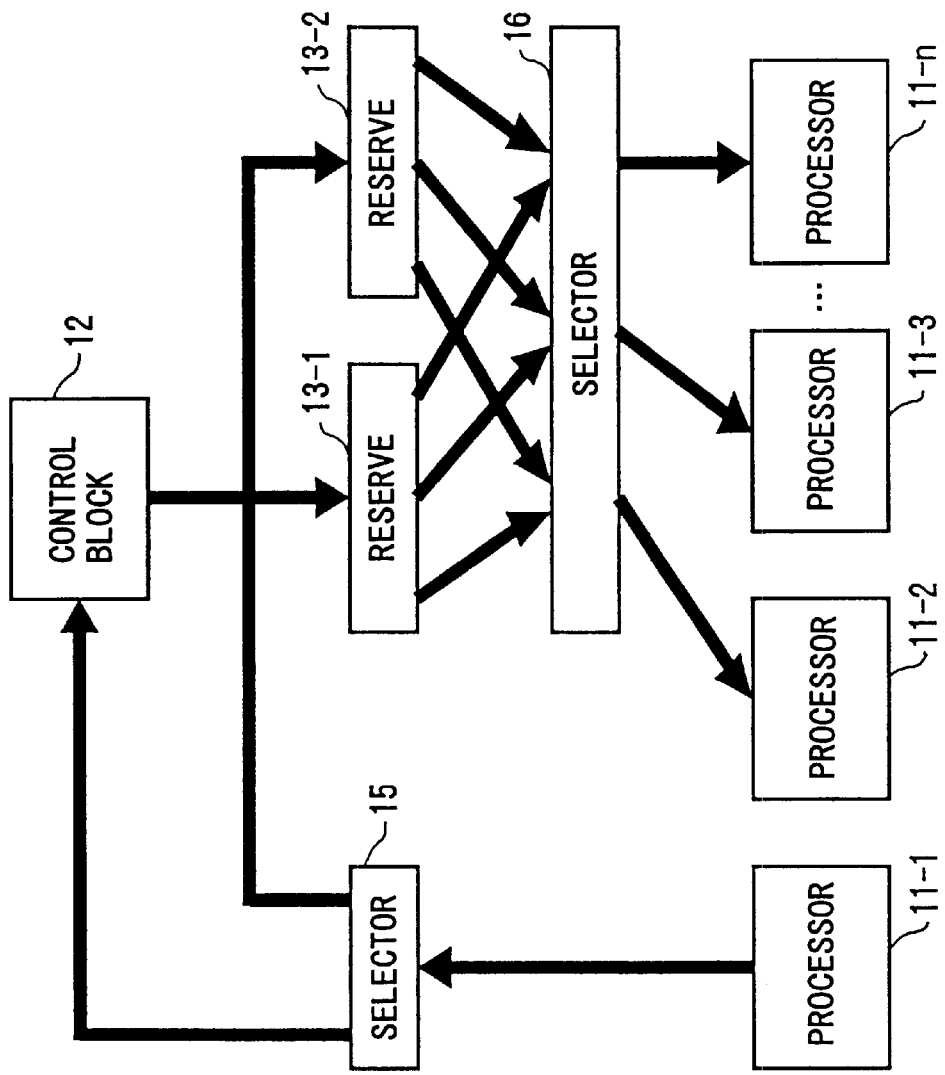
FIG. 7 is a system block diagram showing a third embodiment of the information processing apparatus according to the present invention.

FIG. 7 is a system block diagram showing a third embodiment of the information processing apparatus according to the present invention. This third embodiment of the information processing apparatus employs a third embodiment of the transfer control method according to the present invention.

In FIG. 7, those parts which are the same as those corresponding parts in FIG. 3 are designated by the same reference numerals, and a description thereof will be omitted.

In this embodiment, a selector 16 is provided between the reserves 13-1 and 13-2 and the processors 11-2 through 11-n, as shown in FIG. 7. The selector 16 selects a route via which the data and commands obtained via the asynchronous transfer route and the data and commands obtained via the synchronous transfer route are to be supplied to the request destination processors 11-2 through 11-n. Hence, the route from the selector 16 to the request destination processors 11-2 through 11-n need only be one with respect to each of the request destination processors 11-2 through 11-n. Therefore, it is possible to simplify the connections with respect to the request destination processors 11-2 through 11-n.

Figure 8:
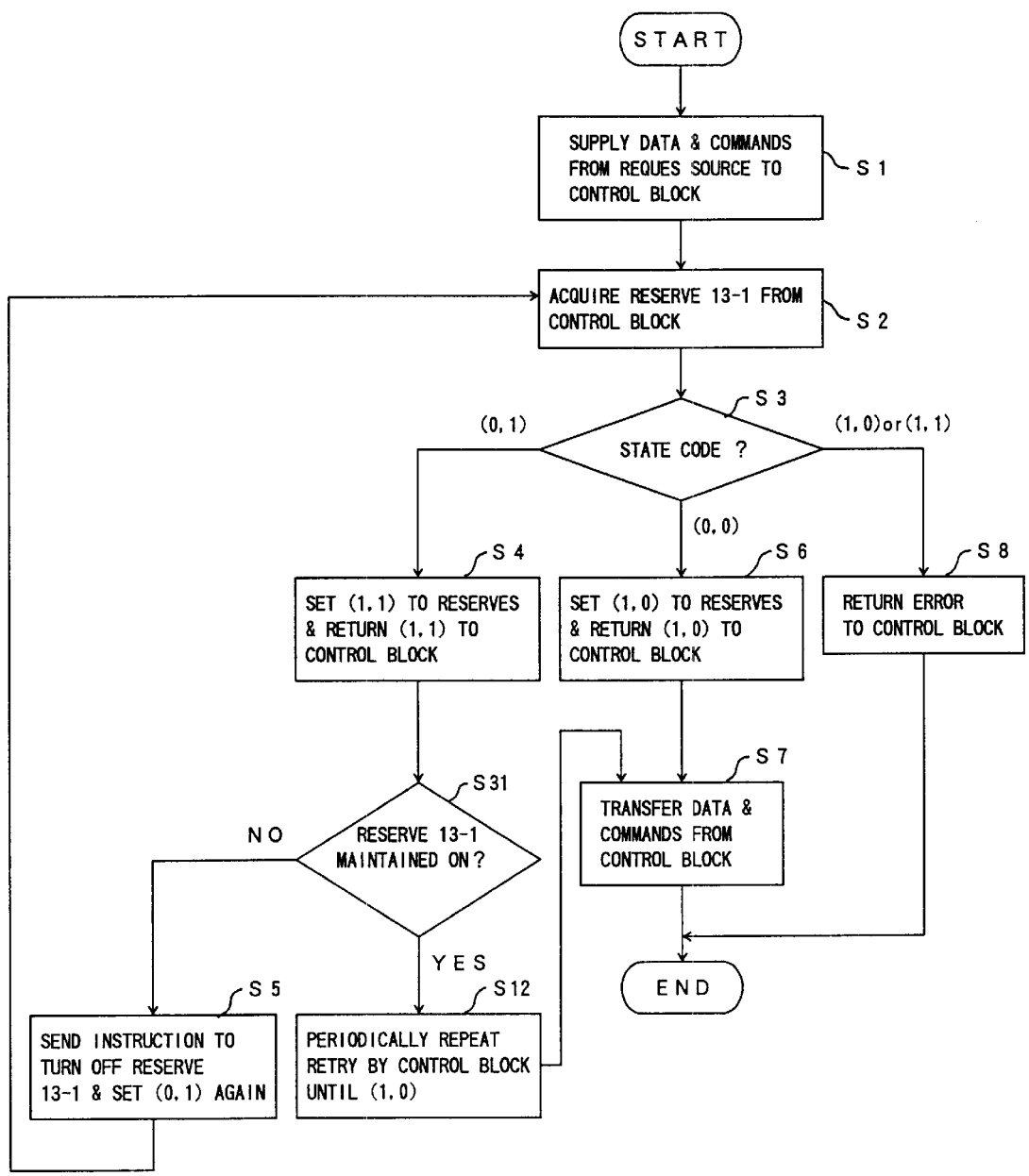
FIG. 8 is a flow chart for explaining the operation of the third embodiment when an asynchronous transfer route is selected and when the asynchronous transfer route is given priority.

FIG. 8 is a flow chart for explaining the operation of this third embodiment when the asynchronous transfer route is selected, and when the asynchronous transfer route is given priority after the request for the synchronous transfer route ends. In FIG. 8, those steps which are the same as those corresponding steps in FIGS. 4 and 5 are designated by the same reference numerals, and a description thereof will be omitted.

In FIG. 8, after the step S4, a step S31 decides by the control block 12 whether or not the reserve 13-1 is to be maintained ON. If the decision result in the step S31 is NO, the step S5 sends the instruction for turning the reserve 13-1 OFF from the control block 12, and the state code is again set to (0, 1). After the step S5, the process returns to the step S2. On the other hand, if the decision result in the step S31 is YES, a step S12 periodically repeats a retry by the control block 12 until the state code becomes (1, 1), and the process advances to the step S7 after the step S12. In this case, the step S7 transfers the data and commands from the control block 12 to the reserve 13-1, and the process ends.

The operation of this third embodiment when the synchronous transfer route is selected is the same as the operation described above in conjunction with FIG. 6, and a description thereof will be omitted.

Figure 9:
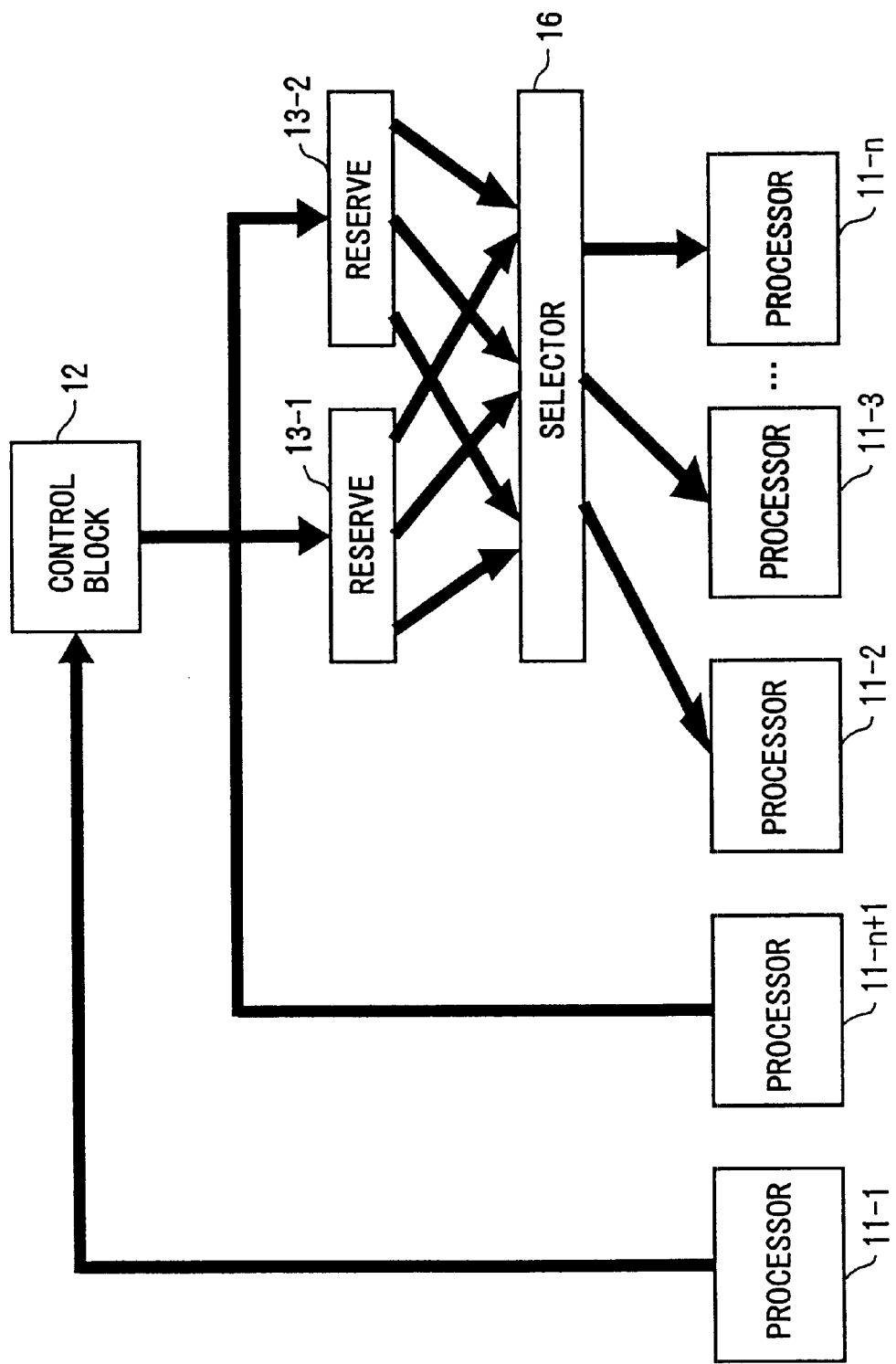
FIG. 9 is a system block diagram showing a fourth embodiment of the information processing apparatus according to the present invention.

FIG. 9 is a system block diagram showing a fourth embodiment of the information processing apparatus according to the present invention. This fourth embodiment of the information processing apparatus employs a fourth embodiment of the transfer control method according to the present invention. In FIG. 9, those parts which are the same as those corresponding parts in FIG. 7 are designated by the same reference numerals, and a description thereof will be omitted.

In this embodiment, a plurality of request source processors are provided as shown in FIG. 9.

FIG. 9 shows a case where two request source processors 11-1 and 11-n+1 are provided, but the number of request source processors is of course not limited to two but may be three or more. In addition, the request source processor 11-1 is fixedly provided with respect to the asynchronous transfer route, while the request source processor 11-n+1 is fixedly provided with respect to the synchronous transfer route.

By fixedly providing one reserve with respect to each of the request source processors, it becomes possible to select the asynchronous transfer and the synchronous transfer without providing the selector 15.

Figure 10:
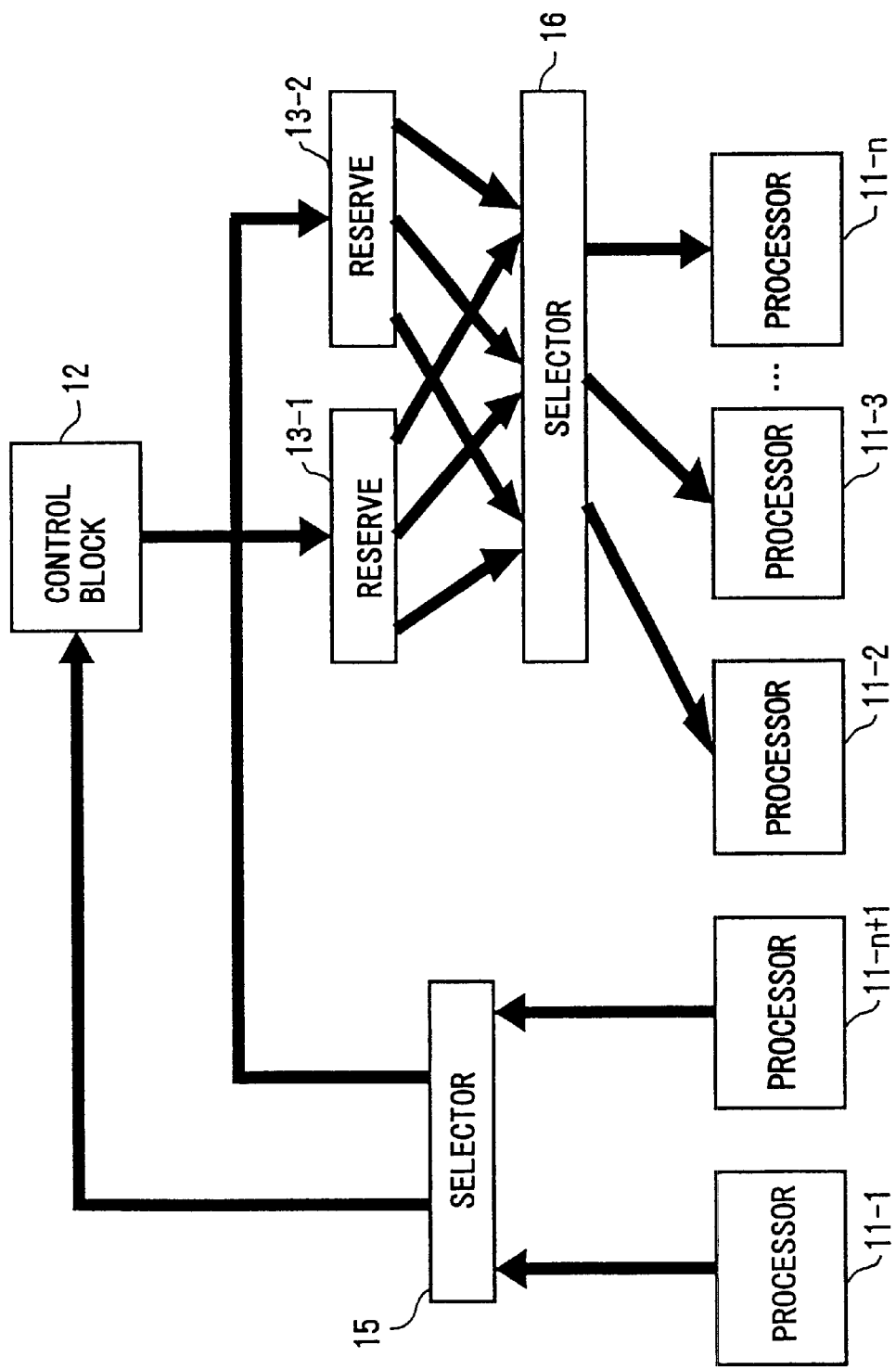
FIG. 10 is a system block diagram showing a fifth embodiment of the information processing apparatus according to the present invention.

FIG. 10 is a system block diagram showing a fifth embodiment of the information processing apparatus according to the present invention. This fifth embodiment of the information processing apparatus employs a fifth embodiment of the transfer control method according to the present invention. In FIG. 10, those parts which are the same as those corresponding parts in FIGS. 7 and 9 are designated by the same reference numerals, and a description thereof will be omitted.

In this embodiment, two request source processors 11-1 and 11-n+1 are provided, but the number of request source processors is of course not limited to two and may be three or more. In addition, the selector 15 is provided between the request source processors 11-1 and 11-n+1, and the asynchronous transfer route and the synchronous transfer route. Hence, depending on the requests from the request source processors 11-1 and 11-n+1, the selector 15 can select the asynchronous transfer route and the synchronous transfer route.

In this embodiment, it is also possible to set an absolute priority order depending on the request source processor. For example, if the priority order of the processor 11-1 is set higher than the priority order of the processor 11-n+1, and the request from the processor 11-1 and the request from the processor 11-n+1 specify the same route, the selector 15 accepts the request from the processor 11-1 having the higher priority order even if the two requests are received simultaneously. As a result, it becomes possible to quickly process the requests from the processors having a higher priority order with priority over the requests from the processors having a lower priority order.

On the other hand, the selector 15 may be constructed to fixedly select the asynchronous transfer route or the synchronous transfer route depending on the request source processors 11-1 and 11-n+1.

In addition, it is possible not to set the absolute priority order depending on the request source processor. In this case, the reserves 13-1 and 13-2 may be constructed to hold a record or history of the request source processor which last acquired each of the reserves 13-1 and 13-2. Hence, even if the requests from the request source processors 11-1 and 11-n+1 specify the same route and are generated simultaneously, it becomes possible to give priority to the processing of the request from the processor which did not previously acquire the reserves 13-1 and 13-2, based on the record or history held in the reserves 13-1 and 13-2. As a result, it is possible to prevent the reserve acquisition frequency from becoming greatly different among the plurality of request source processors.

Therefore, by providing the selector 15 in common with respect to each of the request source processors, the asynchronous transfer and the synchronous transfer can be made fixedly or selectively, depending on the requests from the plurality of request source processors.

Figure 11:
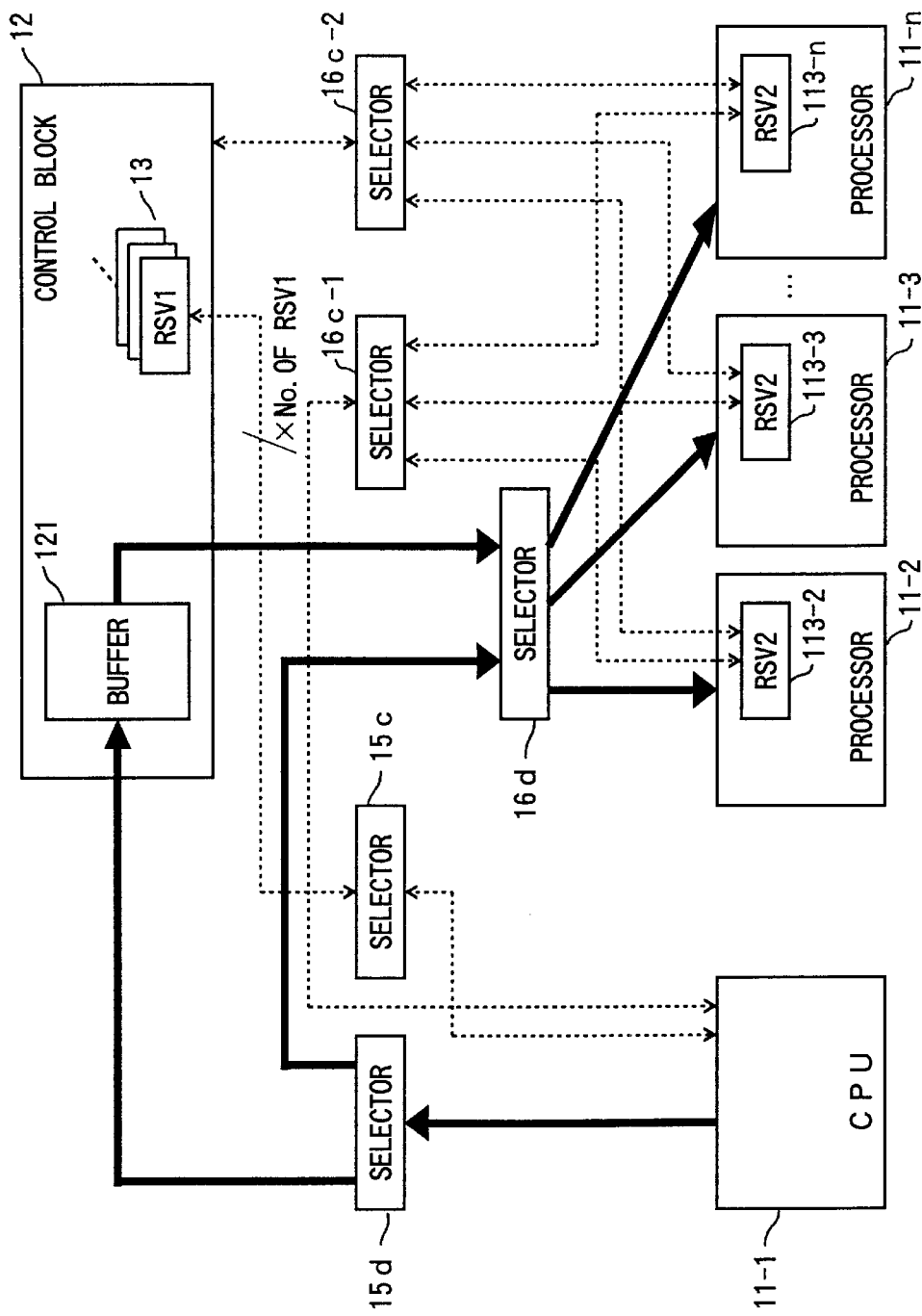
FIG. 11 is a system block diagram showing a sixth embodiment of the information processing apparatus according to the present invention.

FIG. 11 is a system block diagram showing a sixth embodiment of the information processing apparatus according to the present invention. This sixth embodiment of the information processing apparatus employs a sixth embodiment of the transfer control method according to the present invention. In FIG. 11, those parts which are the same as those corresponding parts in FIG. 10 are designated by the same reference numerals, and a description thereof will be omitted.

For the sake of convenience, the data bus and the control signal bus are illustrated as a single signal line by a bold line in FIG. 10 and the like. In FIG. 11 and FIGS. 13 through 15 which will be described hereunder, the data bus is indicated by a bold line, and the control signal bus is indicated by a broken line. Furthermore, in FIG. 11, RSV1 indicates a reserve for a case where the asynchronous transfer route via the control block 12 is used, and RSV2 indicates a reserve for a case where the synchronous transfer route which does not pass through a control block is used.

In this embodiment, the request source processor 11-1 is formed by a CPU, as shown in FIG. 11. In addition, the request destination processors 11-2 through 11-n are formed by general purpose processors respectively provided with reserves 113-2 through 113-n with exclusive bits which are provided in advance. The control block 12 is formed by a general purpose processor including a buffer 121 and a plurality of reserves 13 including RSV1. In this embodiment, the plurality of reserves 13 are realized by microprogram control. Selectors 15d and 16d are provided with respect to the data bus. On the other hand, selectors 15c, 16c-1 and 16c-2 are provided with respect to the control signal bus.

The selector 15d selects, based on an operation code within the command, whether to supply the data and commands from the request source processor 11-1 to the asynchronous transfer route via the control block 12 or the synchronous transfer route which does not pass through the control block 12.

Figure 12:
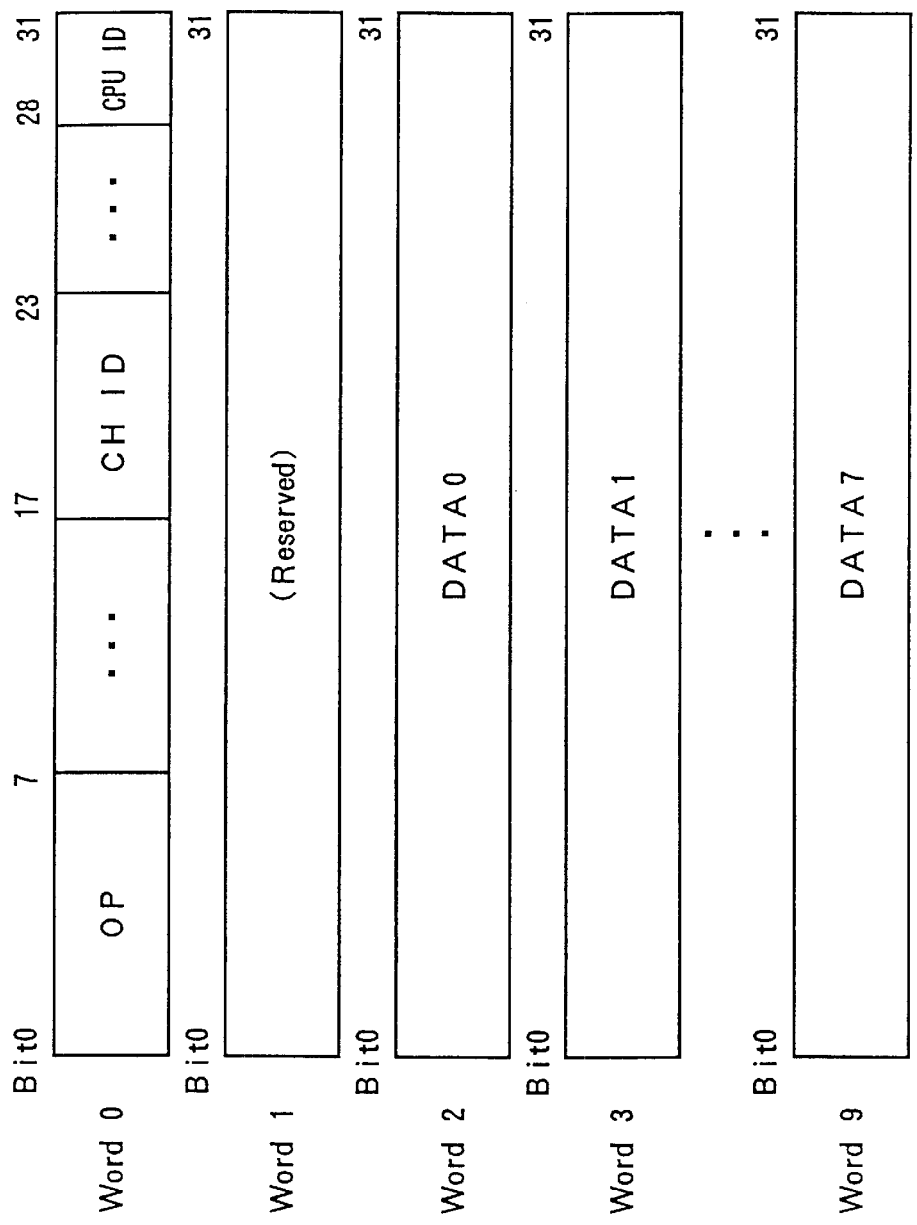
FIG. 12 is a diagram showing formats of commands and data.

FIG. 12 is a diagram showing formats of the commands and data. The data and commands from the processor 11-1 are transferred in units of packets, where each packet is made up of words Word0 through Word9 as shown in FIG. 12, for example. The word Word0 includes an operation code OP which forms the command, a processor identification information CHID which indicates the request destination processor, a processor identification information CPUID which indicates the request source processor, and the like. The operation code OP takes different values for the case where the asynchronous transfer is specified and the case where the synchronous transfer is specified. The word Word1 is made up of a reserved field. The words Word2 through Word9 are respectively made up of data DATA0 through DATA7.

When the request source processor 11-1 requires the information in the reserve 13 within the control block 12, the selector 15c selects only the information in the one of the plurality of reserves 13 having the required information. When the request source processor 11-1 requires the information in the reserves 113-2 through 113-n within the request destination processors 11-2 through 11-n, the selector 16c-1 selects only the information in one of the reserves 113-2 through 113-n within the request destination processors 11-2 through 11-n. When the control block 12 requires the information in the reserves 113-2 through 113-n within the request destination processors 11-2 through 11-n, the selector 16c-2 selects only the information in one of the reserves 113-2 through 113-n within the request destination processors 11-2 through 11-n. In addition, the selector 16d selects the asynchronous transfer route or the synchronous transfer route so as to supply to the request destination processor the data and commands sent from the request source processor 11-1 or the control block 12.

It is possible to suppress the cost of the information processing apparatus by realizing the plurality of reserves 13 by the microprogram control, and by realizing the selectors 15d, 15c, 16c-1, 16c2 and 16d by general purpose selectors.

Figure 13:
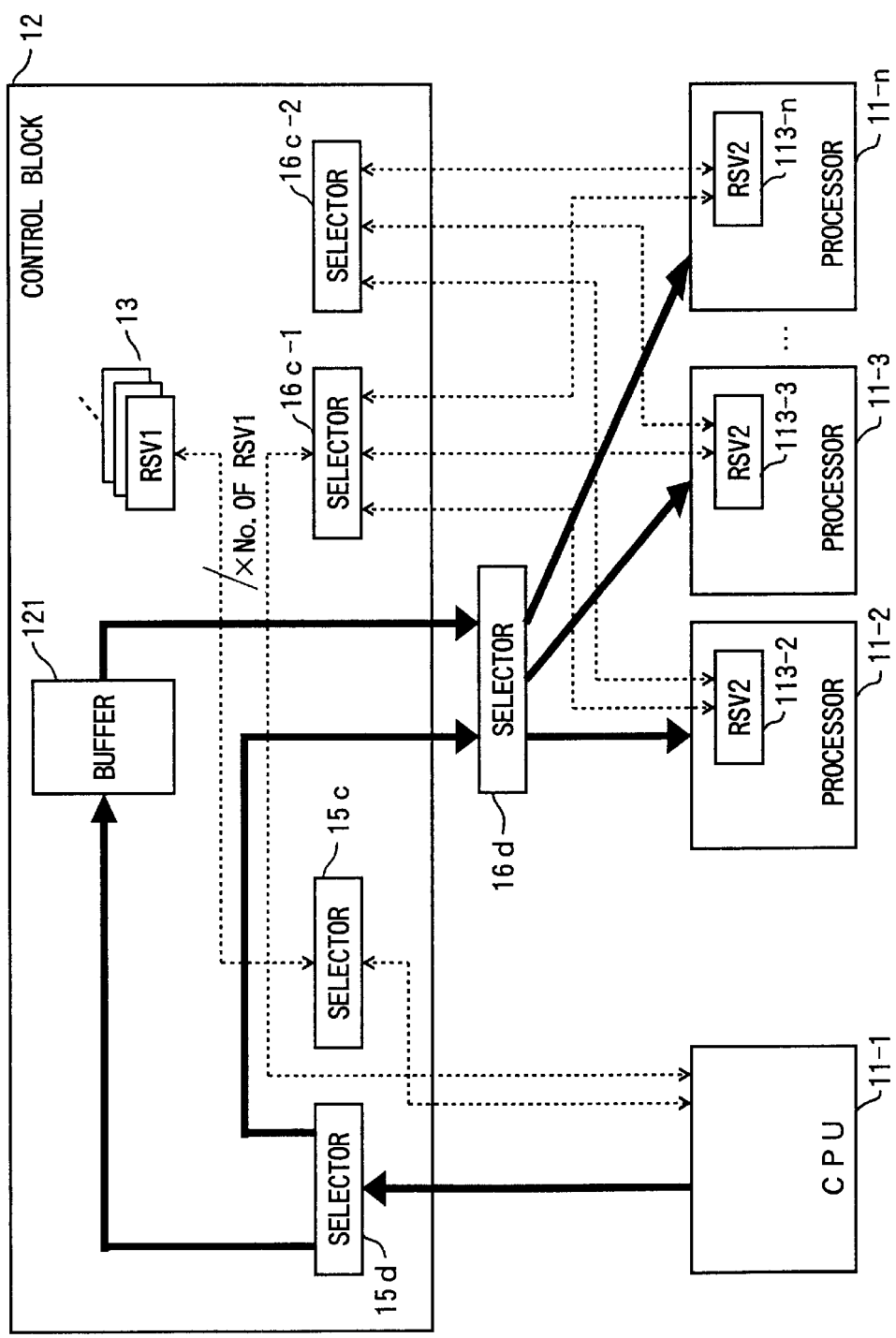
FIG. 13 is a system block diagram showing a seventh embodiment of the information processing apparatus according to the present invention.

FIG. 13 is a system block diagram showing a seventh embodiment of the information processing apparatus according to the present invention. This seventh embodiment of the information processing apparatus employs a seventh embodiment of the transfer control method according to the present invention. In FIG. 13, those parts which are the same as those corresponding parts in FIG. 11 are designated by the same reference numerals, and a description thereof will be omitted.

In FIG. 13, the control block 12 is formed by a processor which includes the buffer 121, the plurality of reserves 13, and the selectors 15d, 15c, 16c-1 and 16c-2. When the plurality of reserves 13 and the selectors 15d, 15c, 16c-1 and 16c-2 are realized by the microprogram control, the control block 12 can be realized by a general purpose processor, thereby making it possible to suppress the cost of the control block 12. In addition, when the plurality of reserves 13 and the selectors 15d, 15c, 16c-1 and 16c-2 are realized by hardware, the control block 12 can be realized by an exclusive processor, so that the processing can be carried out at a high speed.

Figure 14:
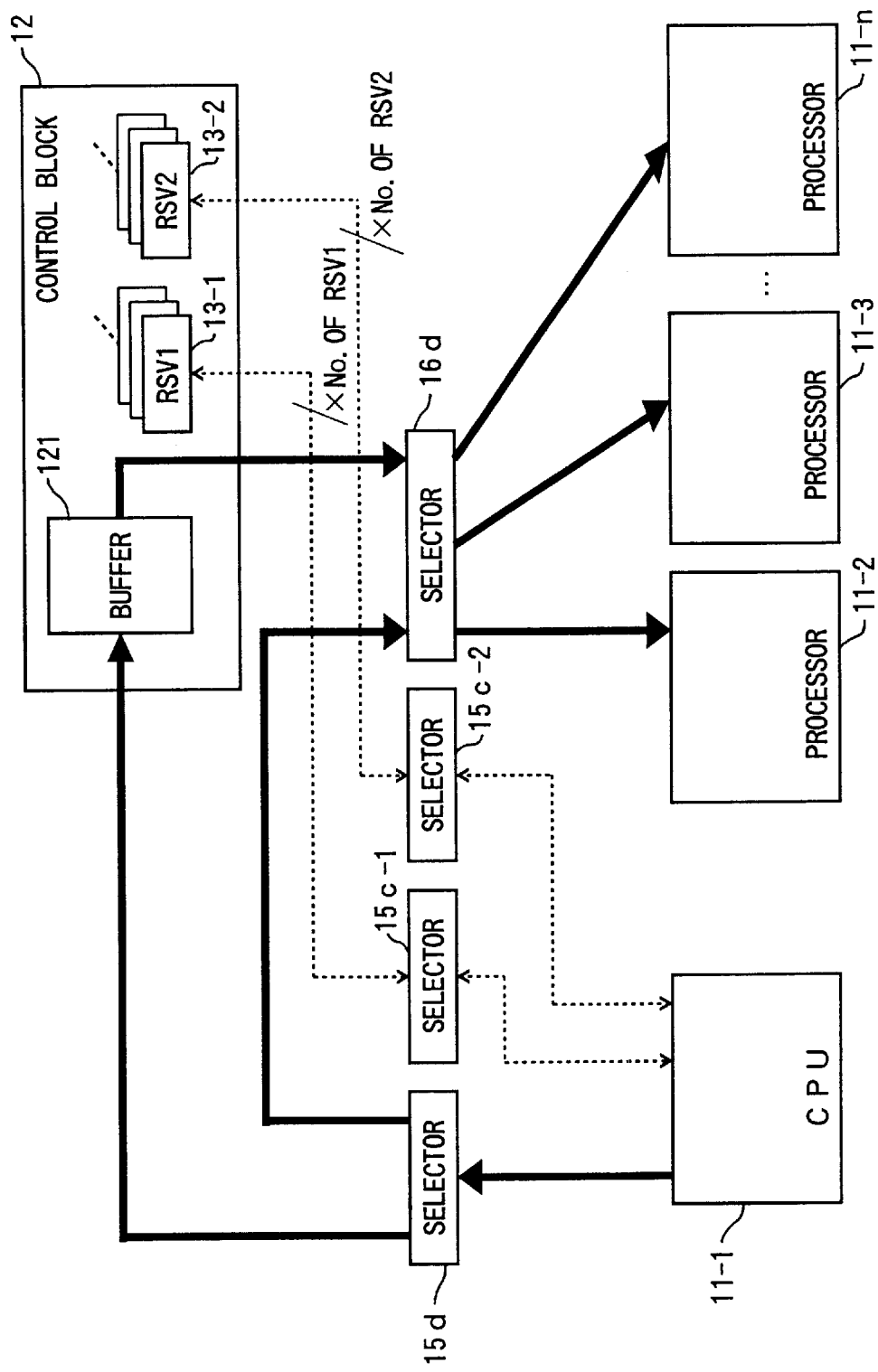
FIG. 14 is a system block diagram showing an eighth embodiment of the information processing apparatus according to the present invention.

FIG. 14 is a system block diagram showing an eighth embodiment of the information processing apparatus according to the present invention. This eighth embodiment of the information processing apparatus employs an eighth embodiment of the transfer control method according to the present invention. In FIG. 14, those parts which are the same as those corresponding parts in FIG. 11 are designated by the same reference numerals, and a description thereof will be omitted.

In this embodiment, the request source processor 11-1 is formed by a CPU as shown in FIG. 14, and the request destination processors 11-2 through 11-n are formed by general purpose processors not provided with exclusive bits in advance. The control block 12 is formed by a general purpose processor which includes a buffer 121, a plurality of reserves 13-1 including RSV1, and a plurality of reserves 13-2 including RSV2. In this embodiment, the plurality of reserves 13-1 and 13-2 are realized by microprogram control. Selectors 15d and 16d are provided with respect to the data bus, and selectors 15c-1 and 15c-2 are provided with respect to the control signal bus.

The selector 15d selects, based on the operation code within the command, whether to supply the data and commands from the request source processor 11-1 to the asynchronous transfer route via the control block 12 or the synchronous transfer route which does not pass through the control block 12. When the request source processor 11-1 requires the information in the reserves 13-1 within the control block 12, the selector 15c-1 selects only the information in one of the reserves 13-1 having the required information. When the request source processor 11-1 requires the information in the reserves 13-2 within the control block 12, the selector 15c-2 selects only the information in one of the reserves 13-2 having the required information. The selector 16d selects the asynchronous transfer route or the synchronous transfer route, so as to supply the data and commands supplied from the request source processor 11-1 or the control block 12 to the request destination processor.

When the reserves 13-1 and 13-2 are managed within the control block 12, it is possible to carry out an exclusive control by the control block 12 at a high speed. In addition, by realizing the selectors 15d, 15c-1, 15c-2 and 16d by general purpose selectors, it becomes possible to suppress the cost of the information processing apparatus. Furthermore, the processing speed of the information processing apparatus can be improved by realizing the selectors 15d, 15c-1, 15c-2 and 16d by exclusive hardware.

Figure 15:
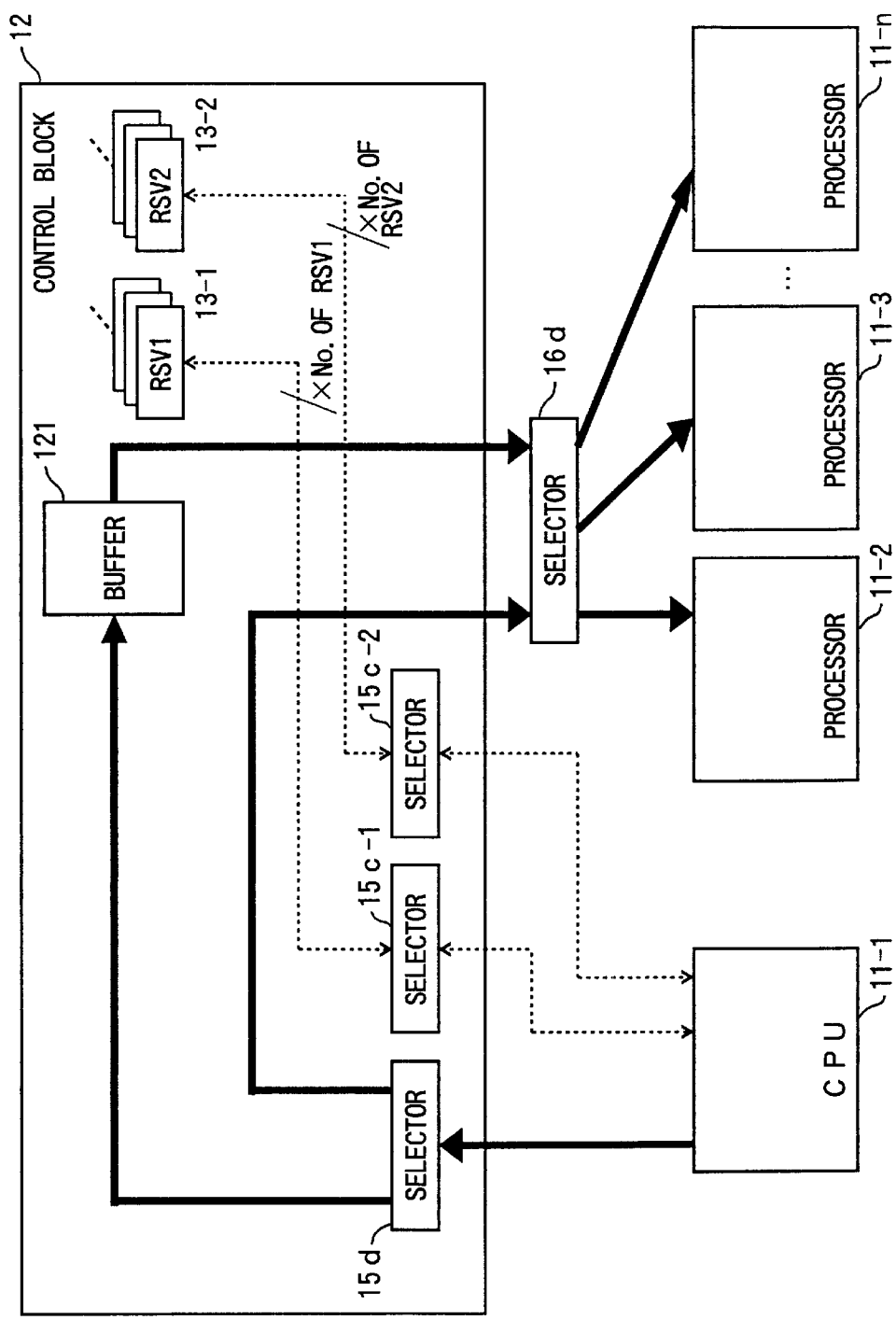
FIG. 15 is a system block diagram showing a ninth embodiment of the information processing apparatus according to the present invention.

FIG. 15 is a system block diagram showing a ninth embodiment of the information processing apparatus according to the present invention. This ninth embodiment of the information processing apparatus employs a ninth embodiment of the transfer control method according to the present invention. In FIG. 15, those parts which are the same as those corresponding parts in FIG. 14 are designated by the same reference numerals, and a description thereof will be omitted.

In this embodiment, the request source processor 11-1 is formed by a CPU as shown in FIG. 15, and the request destination processors 11-2 through 11-n are formed by general purpose processors not provided with exclusive bits in advance. The control block 12 is formed by a processor which includes a buffer 121, a plurality of reserves 13-1 including RSV1, a plurality of reserves 13-2 including RSV2, and selectors 15d, 15c-1 and 15c-2.

In a case where the plurality of reserves 13-1 and 13-2 and the selectors 15d, 15c-1 and 15c-2 are realized by microprogram control, it is possible to realize the control block 12 by a general purpose processor, thereby making it possible to suppress the cost of the control block 12. In addition, in a case where the plurality of reserves 13-1 and 13-2 and the selectors 15d, 15c-1 and 15c-2 are realized by hardware, the control block 12 can be realized by an exclusive processor, thereby making it possible to carry out the processing at a high speed.

Figure 16:
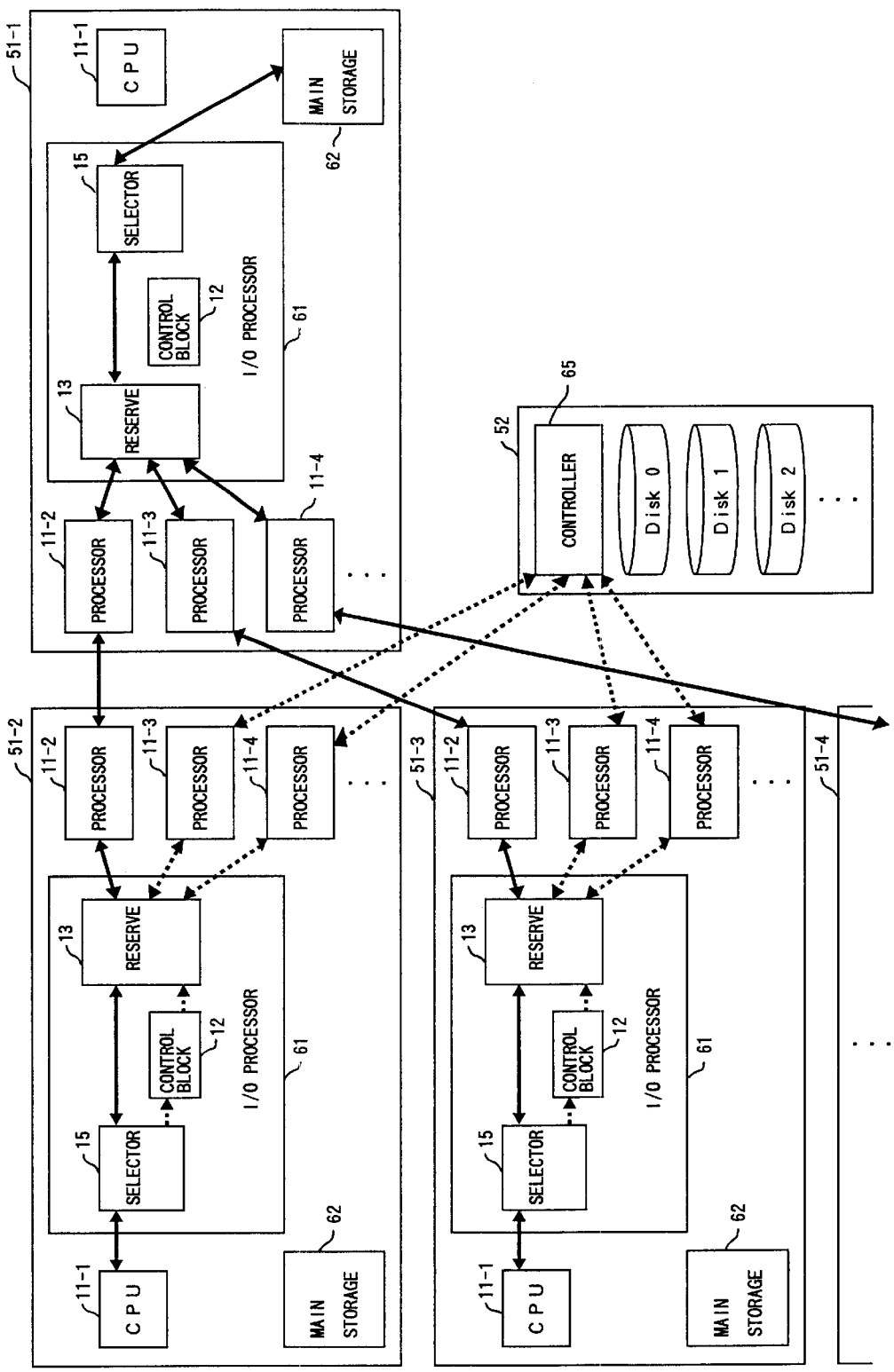
FIG. 16 is a system block diagram showing a system to which the present invention may be applied.

Next, a description will be given of a system to which the information processing apparatus according to the present invention and the transfer control method according to the present invention may be applied, by referring to FIGS. 16 through 18. FIG. 16 is a system block diagram showing the system to which the present invention may be applied. In FIG. 16, those parts which are the same as those corresponding parts in FIG. 2 are designated by the same reference numerals, and a description thereof will be omitted. FIGS. 17(a) through (k) and FIGS. 18(a) through (k) are time charts for explaining the operation of the system shown in FIG. 16.

The system shown in FIG. 16 includes a plurality of clusters 51-1 through 51-n, and a file system 52, and is applied with the first embodiment of the present invention. The clusters 51-1 through 51-n have the same construction, and the cluster 511 functions as a master while the clusters 51-2 through 51-n function as slaves. For the sake of convenience, FIG. 16 shows only four clusters 51-1 through 51-4. In addition, in order to facilitate understanding of the routes by simplifying the drawing, FIG. 16 shows only one example of the route via which the data and commands are transferred, and the illustration of the actual connections of the buses will be omitted. In FIG. 16, bold lines indicate the synchronous transfer route, and bold broken lines indicate the asynchronous transfer route.

Each of the clusters 51-1 through 51-4 includes processors 11-1 through 11-n, an input/output (I/O) processor 61, and a main storage unit 62. For the sake of convenience, FIG. 16 shows only four processors 11-1 through 11-4. The processor 11-1 is formed by a CPU which is connected to the main storage unit 62, and the processors 11-2 through 11-4 are respectively formed by channel processors. The I/O processor 61 includes a control block 12, a reserve 13 and a selector 15. The control block 12 is formed by a channel manager.

The file system 52 has a known construction including a controller 65 and a plurality of disks Disk0, Disk1, . . . ,.

As an example of the system operation, FIG. 16 shows the flow of data and commands for a case where each of the slave clusters 51-2 through 51-4 makes access to the file system 52 by asynchronous transfer, and accessed results of the asynchronous transfer are stored in the main storage unit 62 of the master cluster 51-1. In this state, prior to the access to the file system 52 from the slave clusters 51-2 through 51-4, an access is made to the main storage unit 62 of the master cluster 51-1. In order for the slave clusters 51-2 through 51-4 to make access to the file system 52, it is necessary to rewrite a control table within the main storage unit 62 of the master cluster 51-1.

Figure 17:
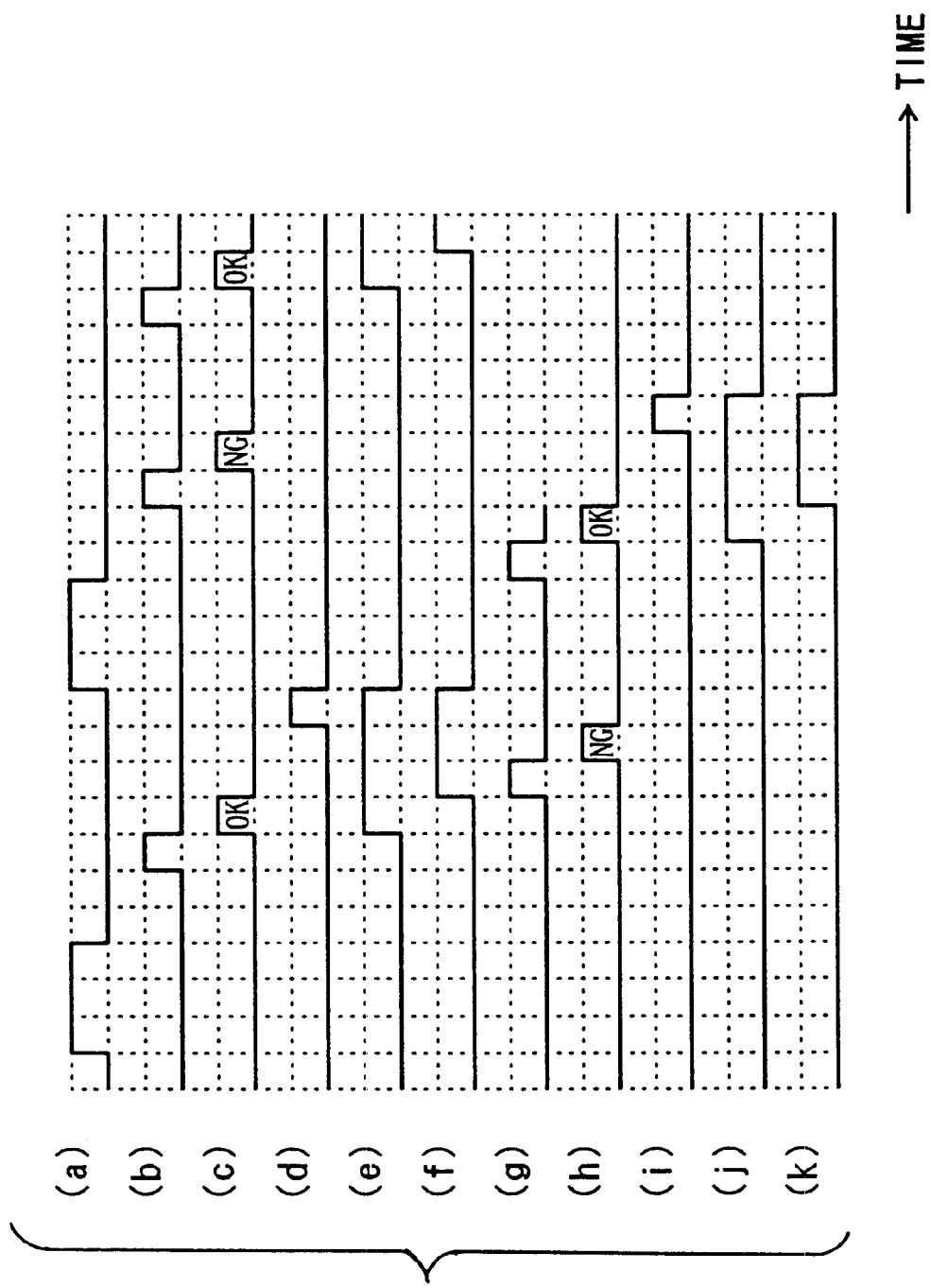
FIGS. 17(a) through (k) is a time chart for explaining the operation of the system shown in FIG. 16.

FIG. 17 is a time chart for explaining transfer timings of the data and commands for a case where no priority order is provided with respect to the asynchronous transfer request from the channel manager and the synchronous transfer request from the CPU, in each of the clusters 51-1 through 51-4. In FIG. 17, (a) shows the timing at which the request from the CPU is transferred, (b) shows a timing at which RSV1 of the reserve 13 is set from the channel manager, that is, the control block 12, (c) shows a timing at which RSV1 set complete is notified from the reserve 13 to the channel manager, (d) shows a timing at which RSV1 is reset from the channel manager, (e) shows a timing at which RSV1 is acquired, and (f) shows a timing at which the request is transferred from the channel manager. In addition, in FIG. 17, (g) shows a timing at which RSV2 of the reserve 13 is set from the CPU, (h) shows a timing at which RSV2 set complete is notified from the reserve 13 to the CPU, (i) shows a timing at which RSV2 is reset from the CPU, (j) shows a timing at which RSV2 is acquired, and (k) shows a timing at which the request is transferred from the CPU. In FIG. 17, OK indicates successful acquisition of the reserve 13, and NG indicates unsuccessful acquisition of the reserve 13.

Figure 18:
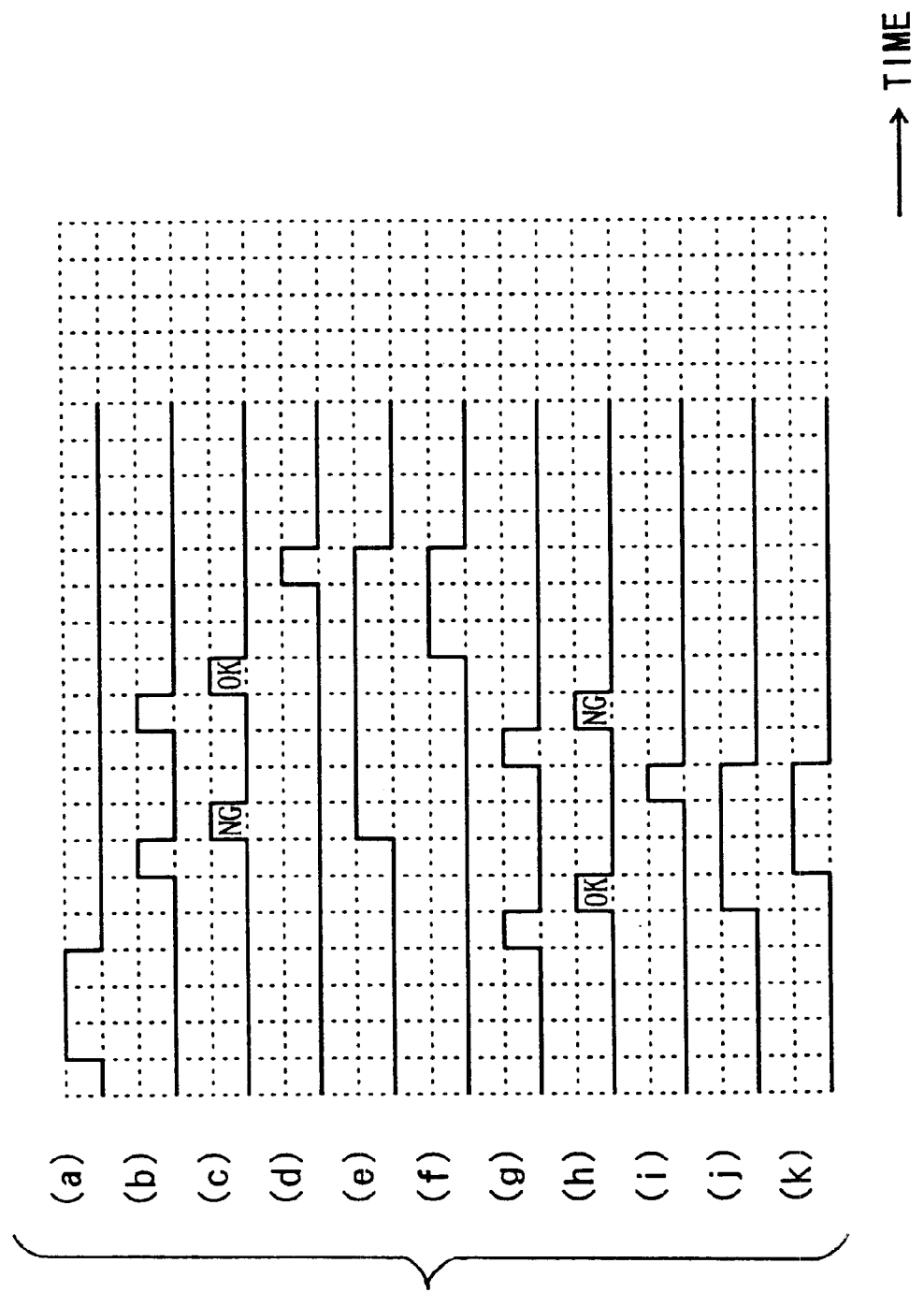
FIGS. 18(a) through (k) is a time chart for explaining the operation of the system shown in FIG. 16.

FIG. 18 is a time chart for explaining transfer timings of the data and commands for a case where the asynchronous transfer request from the channel manager is given priority over, that is, given a priority order higher than that of the synchronous transfer request from the CPU, in each of the clusters 51-1 through 51-4. In FIG. 18, (a) shows the timing at which the request from the CPU is transferred, (b) shows a timing at which RSV1 of the reserve 13 is set from the channel manager, that is, the control block 12, (c) shows a timing at which RSV1 set complete is notified from the reserve 13 to the channel manager, (d) shows a timing at which RSV1 is reset from the channel manager, (e) shows a timing at which RSV1 is acquired, and (f) shows a timing at which the request is transferred from the channel manager. In addition, in FIG. 18, (g) shows a timing at which RSV2 of the reserve 13 is set from the CPU, (h) shows a timing at which RSV2 set complete is notified from the reserve 13 to the CPU, (i) shows a timing at which RSV2 is reset from the CPU, (j) shows a timing at which RSV2 is acquired, and (k) shows a timing at which the request is transferred from the CPU. In FIG. 18, OK indicates successful acquisition of the reserve 13, and NG indicates unsuccessful acquisition of the reserve 13.

For example, in the fourth embodiment shown in FIG. 9, the priority order is provided with respect to the processor itself. However, in the second embodiment shown in FIG. 3, for example, the asynchronous transfer route or the synchronous transfer route may be selected by providing the priority order with respect to the request itself. Further, it is possible to provide the priority order with respect to both the processor and the request.

Further, the present invention is not limited to these embodiments, but various variations and modifications may be made without departing from the scope of the present invention.

What is claimed is:

1. A transfer control method comprising:
   a selecting step which selects one of a first route for making an asynchronous transfer to a request destination via a control block and a second route for making a synchronous transfer to the request destination not via the control block, with respect to a request from a request source,
   wherein said selecting step selects the first route by acquiring a first reserve via the control block, and selects the second route by directly acquiring a second reserve different from the first reserve.

2. The transfer control method as claimed in claim 1, wherein said selecting step selects one of the first route and the second route based on a priority order of the request source and/or a priority order of the request.

3. A transfer control method comprising:
   a selecting step which selects one of a first route for making an asynchronous transfer to a request destination via a control block and a second route for making a synchronous transfer to the request destination not via the control block, with respect to a request from a request source; and
   a step successively making transfer by holding a previously acquired reserve without reacquiring a new reserve,
   wherein said selecting step selects the first route by acquiring a reserve via the control block, and selects the second route by directly acquiring the reserve not via the control block.

4. A transfer control method comprising:
   a selecting step which selects one of a first route for making an asynchronous transfer to a request destination via a control block and a second route for making a synchronous transfer to the request destination not via the control block, with respect to a request from a request source; and
   a step making exclusive control of reserve acquisition,
   wherein said selecting step selects the first route by acquiring a reserve via the control block, and selects the second route by directly acquiring the reserve not via the control block.

5. The transfer control method as claimed in claim 1, which further comprises:
   a step successively making transfer by holding a previously acquired reserve without reacquiring a new reserve.

6. The transfer control method as claimed in claim 1, which further comprises:
   a step making exclusive control of reserve acquisition.

7. An information processing apparatus comprising:

a control block at least having a buffering function;

a selector selecting one of a first route for making an asynchronous transfer to a request destination via said control block and a second route for making a synchronous transfer to the request destination not via said control block, with respect to a request from a request source;

a first reserve; and a second reserve different from said first reserve, said selector selecting the first route by acquiring said first reserve via said control block, and selecting the second route by directly acquiring said second reserve.

8. The information processing apparatus as claimed in claim 7, wherein said selector selects the first route or the second route based on a priority order of the request source and/or a priority order of the request.

9. An information processing apparatus comprising:

a control block at least having a buffering function;

a selector selecting one of a first route for making an asynchronous transfer to a request destination via said control block and a second route for making a synchronous transfer to the request destination not via said control block, with respect to a request from a request source; and means for successively making transfer by holding a previously acquired reserve without reacquiring a new reserve.

10. An information processing apparatus comprising:

a control block at least having a buffering function;

a selector selecting one of a first route for making an asynchronous transfer to a request destination via said control block and a second route for making a synchronous transfer to the request destination not via said control block, with respect to a request from a request source;

means for making exclusive control of reserve acquisition.

11. The information processing apparatus as claimed in claim 7, which further comprises:

means for successively making transfer by holding a previously acquired reserve without reacquiring a new reserve.

12. The information processing apparatus as claimed in claim 7, which further comprises:

means for making exclusive control of reserve acquisition.

* * * * *